F. W. MILLER.
OIL GAGE.
APPLICATION FILED JAN. 24, 1918.
1,281,050.
Patented Oct. 8, 1918.
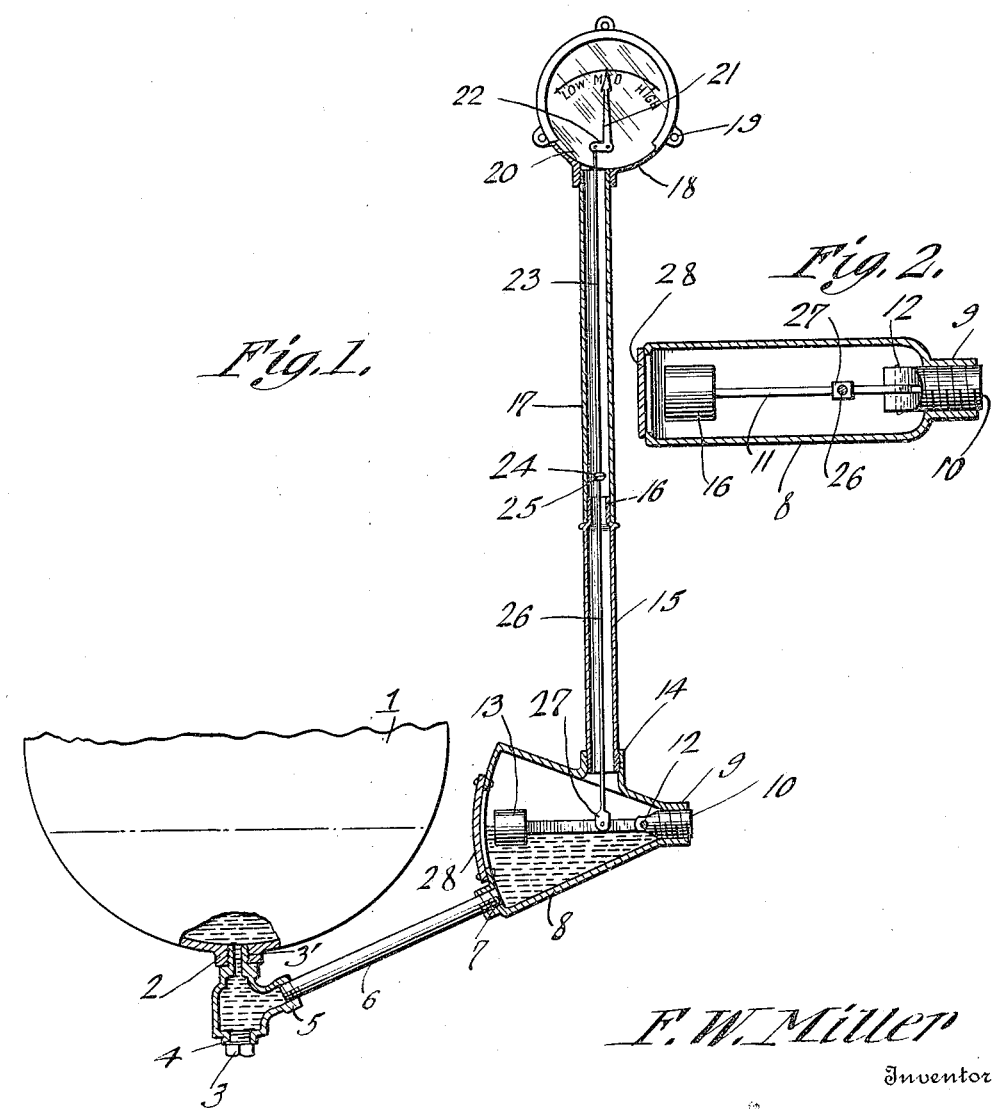
F. W. Miller
Inventor

UNITED STATES PATENT OFFICE.

FRED W. MILLER, OF CHICAGO, ILLINOIS.

OIL-GAGE.

1,281,050.     Specification of Letters Patent.     Patented Oct. 8, 1918.

Application filed January 24, 1918. Serial No. 213,571.

*To all whom it may concern:*

Be it known that I, FRED W. MILLER, a citizen of the United States, residing at Chicago, in the county of Cook and State of Illinois, have invented a new and useful Oil-Gage, of which the following is a specification.

The device forming the subject matter of the present invention is an oil-gage intended to indicate the liquid level in a tank or container, and more especially applicable to the crank case of an internal combustion engine.

Internal combustion engines in which the splash system of lubrication is employed are provided with an oil tight crank case, such case being supplied with the oil by means of which the engine is lubricated. The best results are obtained by maintaining a nearly uniform level after the same has been determined. A rise of oil above this level results in waste and a rapid fouling of the spark-plugs, valves, and cylinders by the deposit of carbon thereon. A fall of the oil below the established level results in an insufficient lubrication and consequent overheating of the parts, causing injury to the bearings of the piston rods and cam and crank shafts.

The present invention provides means whereby the level of the oil in the crank case is indicated at all times so that a proper level may be maintained by supplying oil at suitable intervals.

The invention also provides means including an indicator and a float, the float being so arranged as to be actuated by the rise and fall of the oil in the crank case and the indicator being connected with the float and secured in such position as to be under constant observation.

The invention also contemplates the provision of a gage which may be readily attached to the crank case of an engine without necessitating any change in the crank case.

A still further object within the contemplation of the invention is the provision of a simple, durable and efficient gage.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is illustrated in the accompanying drawing, wherein:—

Figure 1 is a view in elevation, partly in section, of a gage constructed in accordance with the invention, a fragment of the crank case to which it is attached being shown;

Fig. 2 is an enlarged central horizontal section of the float chamber.

Referring to the drawing by numerals of reference:—

The usual crank case is indicated at 1 provided with a depending boss 2 which is apertured and threaded to receive a screw bolt or plug 3 by which it is normally closed.

In carrying out the invention, the plug 3 is removed and a formed hollow casting having a threaded nipple 3' adapted to screw into the boss 2 is attached to the crank case. The hollow casting has a depending boss 4 on its lower face which boss is apertured and threaded to receive the plug 3. A laterally extending nipple 5 is formed on the hollow casting and has threaded connection with one end of a pipe section 6, the other end of which pipe is threaded into a boss 7 formed at the lowermost portion of a float chamber 8.

The float chamber 8 is substantially triangular in side elevation and is formed with a tubular extension 9 which is threaded to receive a screw plug 10, the inner end of which plug is bifurcated to receive one end of an arm 11 which is pivotally secured to the plug by a pin 12, and to the other end of which arm is secured a float 13.

A tubular extension or boss 14 rises from the upper face of the float chamber 8 and into this extension is threaded the lower end of a pipe section 15 the upper end 16 of which is formed to provide a telescopic or slip joint which forms the connection between the pipe section 15 and a section 17. The upper end of the pipe section 17 is threaded into a casing 18 which is provided with apertured ears 19 by which the casing may be attached to the front board of an automobile, or the like.

The casing 18 is provided with a dial 20 in front of which swings a pointer or hand 21, the pointer being pivotally mounted for this purpose. The pointer 21 is formed with an angled or offset end 22 which gives the pointer the form of a bell-crank lever.

The upper end of a rod 23 is pivotally connected to the arm 22 of the pointer and the rod has rigid on its lower end a dished button 24 which is adapted to rest on a button 25, rigid on the upper end of a rod 26. The lower end of the rod 26 is enlarged and bifurcated, as indicated at 27, to straddle the arm 11, to which it is pivotally secured at a medial point on said arm.

For the purpose of facilitating assembling of the parts, the float chamber 8 may be provided with an opening which is normally closed by a plate 28, or, if desired, the float 13 may be of proper size to pass through the extension 9 and the parts assembled in that manner.

Having thus described the invention, what is claimed as new and sought by Letters Patent, is:—

1. An oil-gage, adapted for connection to a fluid receptacle and including a float chamber, a tubular extension on said chamber, a screw plug threaded into said extension, an arm pivotally secured to the plug, a float on the arm, an indicator, operative connection between the indicator and the arm, and fluid connection between the receptacle and the float chamber.

2. An oil-gage, adapted for connection to a fluid container and including a float chamber having an opening, the walls defining said opening being threaded, a plug threaded into said opening, a float pivotally secured to the plug, an indicator, operative connections between the indicator and the float, and fluid connection between the container and the float chamber.

In testimony that I claim the foregoing as my own, I have hereto affixed my signature in the presence of two witnesses.

FRED W. MILLER.

Witnesses:
GUY H. POWELL,
F. W. PROUDFOOT.